Dec. 11, 1956 E. G. CARUTHERS ET AL 2,773,469
HATCH COVER

Filed Aug. 5, 1953 2 Sheets-Sheet 1

INVENTORS.
ROBERT LOWRY
EDWARD G. CARUTHERS
BY
ATTORNEYS.

Dec. 11, 1956 E. G. CARUTHERS ET AL 2,773,469
HATCH COVER
Filed Aug. 5, 1953 2 Sheets-Sheet 2
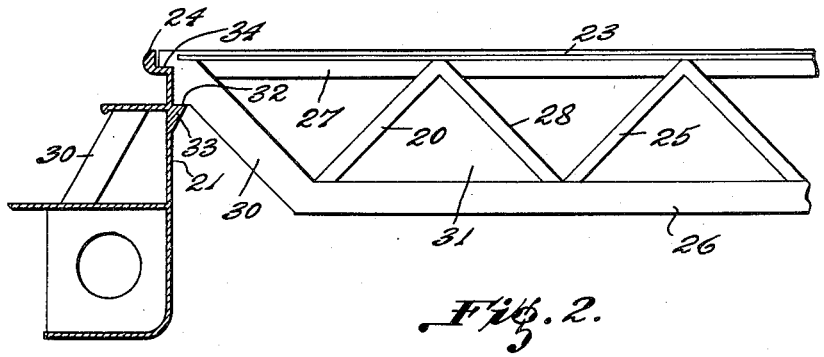
Fig. 2.
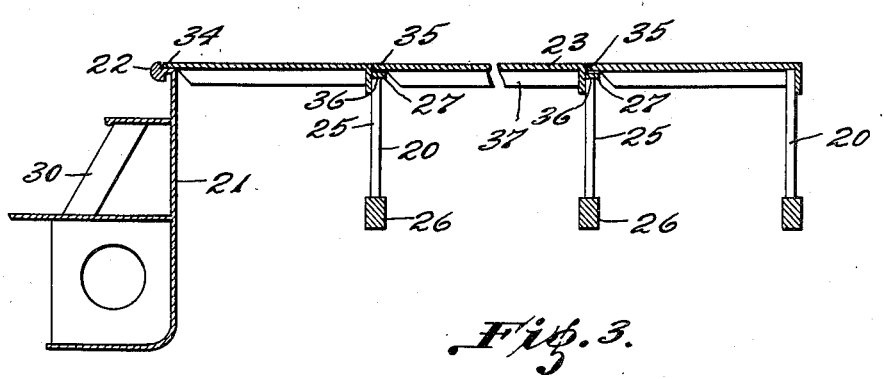
Fig. 3.
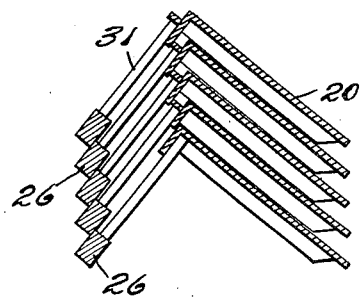
Fig. 5.
INVENTORS.
ROBERT LOWRY
EDWARD G. CARUTHERS
BY
ATTORNEYS.

United States Patent Office 2,773,469
Patented Dec. 11, 1956

2,773,469

HATCH COVER

Edward G. Caruthers, Arlington, and Robert Lowry, Falls Church, Va.

Application August 5, 1953, Serial No. 372,468

2 Claims. (Cl. 114—201)

The present invention relates to hatch covers, particularly of the type which are used on ocean going cargo ships, but permissibly intended for other types of cargo ships, and for covering similar openings of other characters.

A purpose of the invention is to secure an even or unbroken surface on a hatch cover which is well adapted for deck cargo.

A further purpose is to make the hatch cover units more readily removable and easier to store during loading and unloading cargo.

A further purpose is to obtain a hatch cover of great strength, while at the same time permitting simplicity of manufacture.

Further purposes appear in the specification and in the claims.

In the drawings we have chosen to illustrate one only of the numerous embodiments in which our invention may appear, selecting the form shown from the standpoints of convenience in illustration, satisfactory operation and clear demonstration of the principles involved.

Figure 2 is a fragmentary section on the line 2—2 of Figure 1.

Figure 3 is an enlarged fragmentary section on the line 3—3 of Figure 1.

Figure 4 is a perspective of a stack of cover units which have been removed from the hatchway.

Figure 5 is a section on the line 5—5 of Figure 4.

In the drawings like numerals refer to like parts throughout.

Figure 1:
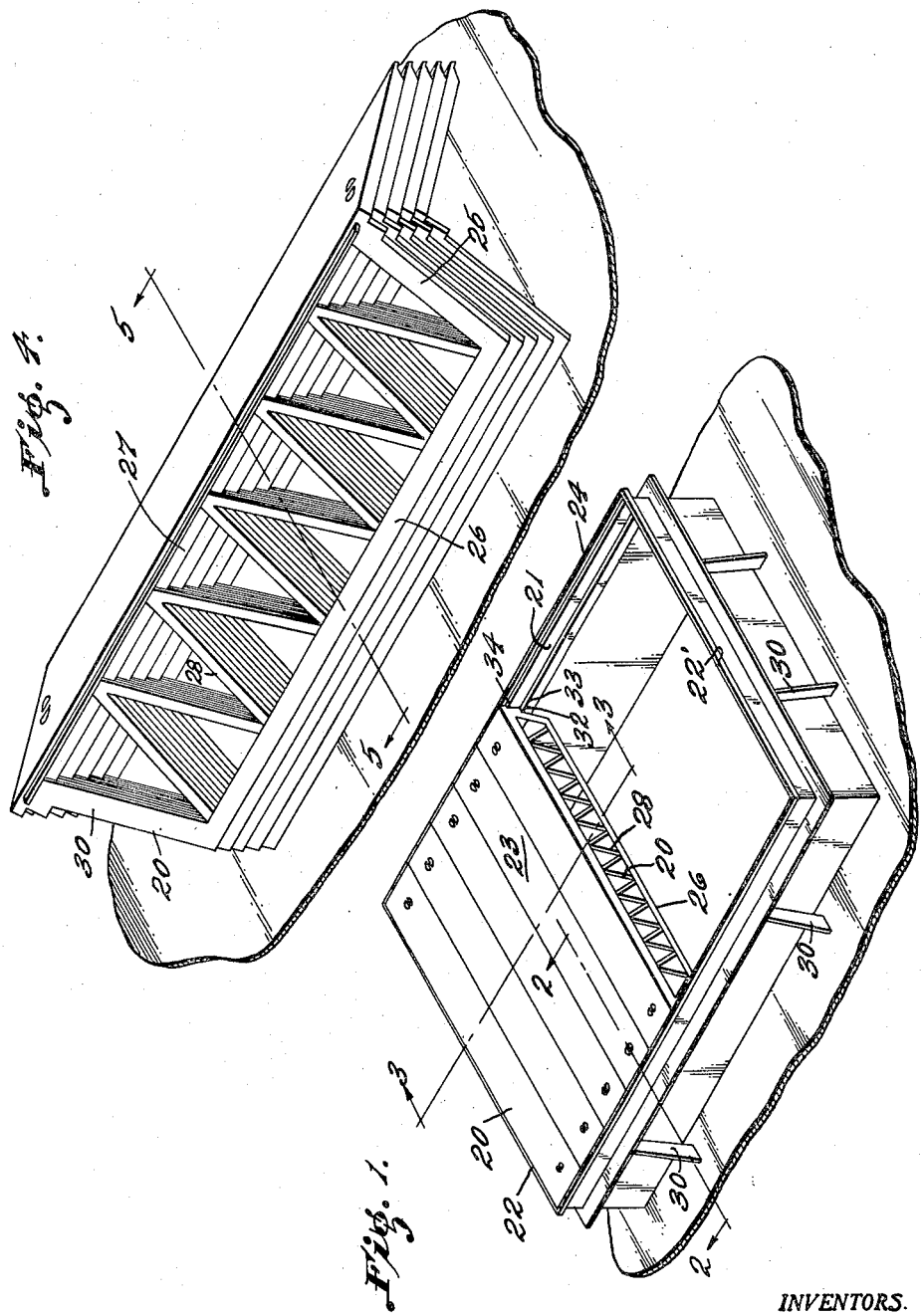
Figure 1 is a perspective of a hatchway partly open and partly covered by a hatch cover in accordance with the invention.

The problem of constructing suitable covers for hatchways of cargo vessels especially of ocean going types, and for similar openings involves a requirement of structural strength and rigidity, convenience in supporting deck cargo, ease of handling and disposability when the hatchways are open. The covers must be sufficiently strong and rigid to bear heavy loads of deck cargo and withstand the violent impact of high seas breaking over the ship. The covers must form a surface well adapted for the storage of deck cargo. They must be removed quickly and conveniently for the sake of operating economy. They must also be capable of storage when the hatch is open in the limited area within reach of the ships lifting gear, and notwithstanding the presence of cargo and sundry equipment.

The hatch covers now available do not adequately meet these requirements. One widely used design is the pontoon type of hatch. This is easy to handle because of the small number of hatch cover units, but it is difficult to store clear of the hatchway because of the great size and thickness. Another hatch cover is the manually portable hatch boards supported by removable hatch shifting beams. The great number of hatch boards required per hatch in this case makes opening and closing a hatch very expensive and time consuming.

A number of quick operating hatch covers are available, comprising hinged or roller mounted sections which stow out of the way at the ends of the hatches. These devices are of high initial cost and difficult to maintain under ocean going conditions.

The present invention involves a hatch cover which has excellent structural strength and rigidity, which has a superior supporting surface for deck cargo, is easy to handle, and disposable when the hatchways are open. In accordance with the invention, the hatch cover is made up of a plurality of hatch cover units. Each hatch cover unit is of angular cross section, consisting of a cover portion which when installed in the hatch extends across the top, and a beam portion which when installed in the hatchway extends downwardly below the cover portion. By reason of their angularity the hatch cover units nest, and they can be stacked for storage.

In accordance with the invention, hatch cover units 20 span the hatchway 21, lying parallel to the hatch end coaming 22, and abutting against one another to close the hatch. The covering portion 23 forms a flat surface at the top, in the plane of the top of the hatch side coaming 24. The opposite angle leg 25 extends downward in assembled position in the hatchway, and forms a beam having a bottom bar 26, a top bar 27, a web 28 and end bars 30 connecting the top and bottom bars. It will of course be understood that the beam may be of any desired form, including a solid sheet or plate, although in the form shown the web is lightened at 31 and the bottom and end bars are desirably thickened.

The end bars 30 have at the end shoulders 32 which rest on a ledge 33, extending inwardly from the coaming 24 and secured there to as by welding. The under sides of the hatch closing portions 23 of the cover units extend out endwise beyond the end bars 32 and rest upon ledge 34 which is located above and outwardly of the ledge 33 and hatching 21 and near the coaming.

The ledge 34 desirably extends all the way around four sides of the hatchway.

The cover units are mutually supporting, the beam portions supporting one side of the cover portions with which they are desirably integral. At one end of the hatch the outside edge 35 of the cover portion desirably rests on the ledge 34 as shown in Figure 2, and the corresponding portion 35 of each succeeding cover portion rests on a ledge 36 on the outside of the upper bar portion of the beam. Longitudinal stiffening ribs 37 beneath the covering portion 23 terminate before encountering the ledge 36 to allow the covering portion to rest flat on the ledge.

Thus each hatch cover unit is supported on both sides for the full width of the hatch.

The ledges may, of course, be continuous or interrupted as required and any or all ledges may be fitted with guides (not shown) to facilitate positioning the cover units when closing the hatch.

It is contemplated that the end of the hatchway which is open in Figure 1 will be closed by covers which are disposed in the same relation to the end coaming 22' as the illustrated covers in Figure 3 bears to the end coaming 22.

It is, however, permissible to close the entire hatch with covers disposed in the same direction if desired.

While the structure shown in the drawings illustrates hatch coamings of the type commonly used for weather deck hatches, it will be understood that the invention is also applicable to 'tween deck hatches.

The covers and the supporting ledges in the illustrations are so designed and arranged as to produce a flat surface when the hatch is closed. If desired the covers or the ledges or both could be altered to produce surfaces with camber or sheer or both or peaked with ridge running fore and aft or thwartships.

When the hatch covers are removed, they will be conveniently stacked in a nest, as shown in Figure 5, with the concave portion of each cover overlying the convex portion of the cover unit below it, or vice versa, thus conserving valuable space.

In view of our invention and disclosure variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claims.

Having thus described our invention what we claim as new and desire to secure by Letters Patent is:

1. A hatch setup comprising a coaming defining a hatch opening and having ends and longitudinal sides, said coaming having a topmost edge running all the way around the opening, a first ledge on the interior side of and a first distance below the topmost edge and running all the way around the hatchway opening and a second ledge on the interior side of and below the first ledge and a second distance below the topmost edge of the coaming and running along the longitudinal sides of the coaming; and a hatch cover made up of a plurality of sections all of which except two are identical to each other and each of which extends across between the longitudinal sides of the coaming, every section including as unitary parts thereof a top surface member having a flat top surface and a beam member in support underneath one edge of said surface member which edge runs between the longitudinal sides of the coaming, the said sections being divided into two groups, the one group of sections comprising a consecutive set of sections starting from one end of the coaming and the other a consecutive set starting from the other end and the beam in each case being on the side of the section away from the end which its group is closer to, a ledge below the top surface extending out from the beam side of each section except the one furthest from the end in each group, said ledge having its top the aforesaid first distance below the top surface, flat underneath mating surfaces on the top surface members at each edge of a section toward the nearest end to that group and at each end of the section and at the ends of the beams, said mating surfaces on the top surface members being at said first distance below said top surface and said mating surfaces in said beams being at said second distance below said top surface, said mating surfaces cooperating with the corresponding ledges on adjacent coaming and sections, and said top surface members forming a continuous unilevel top surface over the entire area within the topmost edge of the coaming and even therewith.

2. In a hatchway, a cover, a coaming having a lower ledge and an upper ledge, the upper ledge being located further from the hatch opening than the lower ledge, and a plurality of hatch cover units in the hatch opening, each cover unit being a unitary structure which is of angular cross section and has a covering leg and a beam leg extending vertically with respect to the covering leg, the beam leg resting at its opposite ends on the lower ledge, the covering leg extending out beyond the beam leg and resting at its ends on the upper ledge, and a ledge along the beam leg of each covering unit supporting the side of the cover leg of an adjacent hatch cover unit.

References Cited in the file of this patent

UNITED STATES PATENTS

| Re. 16,302 | Sherman | Mar. 30, 1926 |
| 1,342,612 | Wood | June 8, 1920 |
| 1,837,674 | Reith | Dec. 22, 1931 |

FOREIGN PATENTS

| 370,653 | Great Britain | Apr. 14, 1932 |